Sept. 16, 1924.
B. H. ANIBAL
1,508,739
RECOIL CHECK FOR USE WITH AUTOMOBILES
Filed June 25, 1919
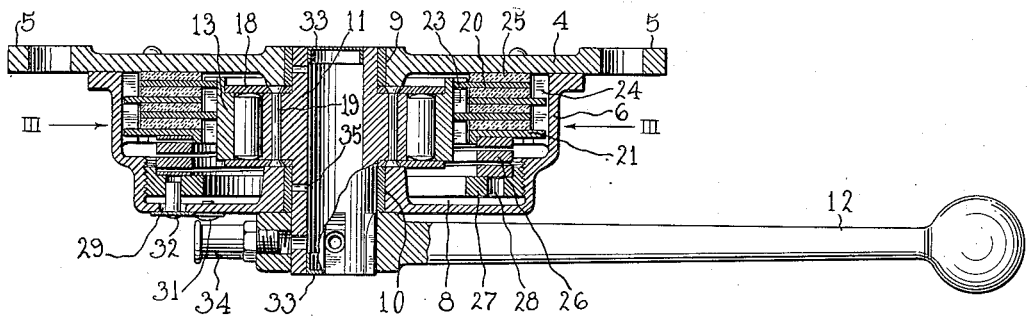
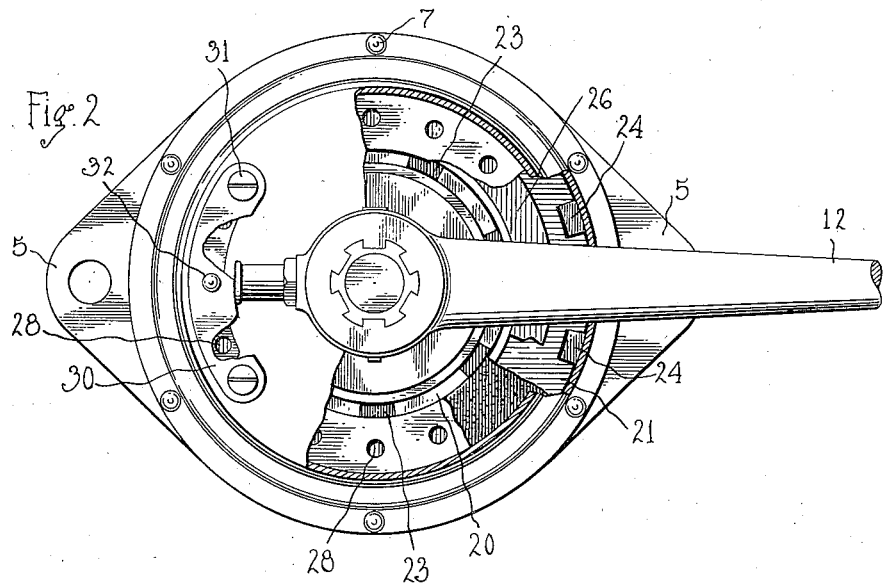
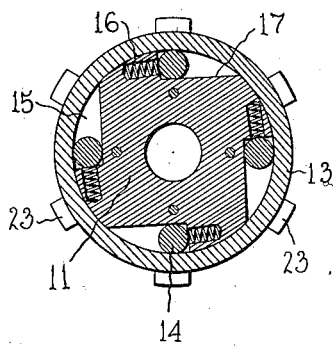
Inventor
Benjamin H. Anibal
By his Attorney
Lloyd Blackmore Patented Sept. 16, 1924.

1,508,739

UNITED STATES PATENT OFFICE.

BENJAMIN H. ANIBAL, OF DETROIT, MICHIGAN, ASSIGNOR TO GENERAL MOTORS CORPORATION, OF DETROIT, MICHIGAN, A CORPORATION OF DELAWARE.

RECOIL CHECK FOR USE WITH AUTOMOBILES.

Application filed June 25, 1919. Serial No. 306,703.

*To all whom it may concern:*

Be it known that I, BENJAMIN H. ANIBAL, a citizen of the United States, and resident of Detroit, Wayne County, State of Michigan, have invented certain new and useful Improvements in Recoil Checks for Use with Automobiles, of which the following is a specification.

My invention relates to shock absorbing devices for use in connection with automobiles and generally for self-propelled vehicles, and particularly to shock absorbing devices of the general class or type designed to prevent a rebounding of the body of the vehicle after the springs have been compressed to an excessive degree; such devices operating under the conditions assumed to resist and restrain upward movement of the body, while at the same time permitting a free and unopposed downward movement thereof.

The object of my invention is to provide a device of the class above referred to which will be simple in construction, effective in its operation, and not likely to get out of order when in use.

Another object of my invention is to provide a shock absorbing device which may be readily adjusted to subject the movement of its parts to different degrees of resistance.

Other objects of my invention are to provide a shock absorbing device in which all the elements and parts thereof are housed within a closed casing, and in which the said parts may be effectively lubricated, or may operate in a bath of oil if desired; and to provide various improvements in and relating to various of the features of shock absorbing devices of the class or type to which my invention relates.

My improved shock absorbing device is illustrated in its preferred form in the accompanying drawing; although it will be appreciated that the same may be modified as to various of its features and that my invention includes all such modifications of the particular embodiment thereof illustrated as will be obvious to those skilled in the art to which my invention relates, so long as such changes and variations come within the scope of the concluding claims wherein the particular features in which the invention consists are enumerated.

Referring to the drawing wherein the preferred embodiment of my invention is illustrated:

Figure 1 is a sectional view of my improved shock absorbing device upon a horizontal plane;

Figure 2 is a view showing the same in side elevation and broken away in places to show features of the internal construction; and, Figure 3 is a view showing a section upon a vertical plane indicated by the line 3—3 of Figure 1.

Referring to the drawing, my improved shock absorbing device comprises a hollow closed casing within which the various parts thereof are housed and protected from dust and from injury due to contact of external objects therewith, which casing may be variously provided; but which in the embodiment of my invention illustrated is shown as comprising a substantially flat base plate 4 having lugs or ears 5 whereby it may be secured to the frame of an automobile or similar vehicle, and a cup-shaped cover section 6 which is secured to said plate by means of fastening devices 7; whereby a closed internal chamber 8 is provided within which the various operating elements of the device are located, the casing thus being referable to as a two part casing although it may obviously be made up of three or more parts if desired.

The casing of my improved shock absorbing device is provided with oppositely disposed bearings 9, 10 in its end walls, which bearings are preferably bushed, as shown, and within which bearings or bushings the two ends of an oscillating hub are supported; said hub being designated by the reference numeral 11 and the same being preferably hollow, as shown, in order to provide an oil reservoir for lubricating the bearings at the ends of said hub and wherein the said ends are supported.

Motion is communicated to the hub 11 through an operating arm 12 fixedly secured to one end thereof, and the free end of which arm is connected with the spring or axle of the vehicle so that oscillatory motion will be imparted to the hub as the frame of the vehicle rises and falls. It will be appreciated however that the casing may be secured to a relatively fixed part of the vehicle, such for example as the axle, and the free end of the arm 12 to the frame thereof, should such an arrangement of parts be deemed necessary or desirable; as my invention, regarded in its broader aspects, is quite independent of the manner in which the two parts thereof are connected one with a relative fixed and the other a relatively movable part of the vehicle, or with the securing means whereby one of the said parts is secured to one and the other to the other of the elements of the vehicle herein mentioned.

Located within the casing aforesaid and surrounding the hub 11 is a rotatable clutch ring 13, the same being supported by the hub and motion being communicated from the hub to the said ring through a plurality of clutch members 14 operating in recesses 15 provided between the interior surface of the said ring and the said hub, thereby forming an ordinary form of clutch mechanism shown in Fig. 3 and through which motion of the hub produces a step by step rotary movement of the clutch ring. These clutch elements 14 are preferably in the form of rollers, and they are acted upon by springs 16 which force them into engagement with the interior of the clutch ring 13 and with the bottom walls 17 of the recess 15 within which they lie.

It will therefore be appreciated that counter-clock wise movement imparted to the hub 11 will advance the clutch ring 13 in the same direction, while movement of the hub in a reverse direction will cause the springs to yield and the clutch members 14 to recede into the wider rear portions of the recesses 15, so that the clutch ring will not be driven during movement of the hub in the clockwise direction.

The hub 11 is preferably provided with an enlarged portion in which the recesses 15 are formed, as clearly shown in the drawing, and which enlarged portion supports the clutch ring 13; and two annular side plates or retaining rings 18 are secured one to each side of this enlarged portion as by fastening members 19; which side plates extend to and embrace the sides of the clutch ring 13, as clearly shown in Fig. 1, thereby holding the said ring in proper position and at the same time holding the rollers 14 in place within the recesses in which they lie.

Surrounding the clutch ring 13 and located within the casing of the device is a plurality of friction discs 20, 21, the number of such discs employed in a single shock absorbing device being variable as my invention is in no way limited to the particular number of friction discs employed. Some of these discs, for example the discs 20, are interlocked with the clutch ring 13 as by means of keys 23 upon said ring which fit into key ways provided in the inner periphery of the said discs, as shown, while other discs such as the discs 21 are interlocked with and held in fixed relation to the casing of the device as by means of keys 24 fitting in key ways upon the outer periphery of the said last mentioned friction discs.

It will therefore be appreciated that the discs 20 partake of the rotary movement imparted to the clutch 13 from the hub 11 through the clutch members above referred to, while the friction discs 21 are held stationary relative to said first mentioned discs and to the casing of the device.

Rings designated by the reference numerals 25 and made from suitable friction material or lining such for example as asbestos fabric, leather, or equivalent material are ordinarily interposed between each two adjacent friction discs, and between the friction disc which is next to the end wall 4 of the casing and the said end wall.

It will be appreciated that the friction discs 20 and 21 are movable laterally because of the key and key way connections provided between their peripheries and the clutch ring and the casing, and said discs are pressed into contact with one another and with the friction rings between them by means of an annular coiled spring 26 acting between the outer of said friction discs and an adjusting ring 27 located within the casing, and the periphery of which is screw threaded as shown and is in engagement with a correspondingly threaded internal portion of the casing, from which it follows that upon screwing said adjustable ring further into the casing the tension of the spring 26 will be increased, and the friction discs and rings pressed into more firm engagement with one another, thereby increasing the resistance to movement on the part of the discs driven from the clutch ring and correspondingly increasing the resistance opposed to movement of the vehicle body due to roughness in the roadway over which the vehicle is passing.

The adjusting ring 27 is provided with a plurality of holes 28, and the end wall of the casing section 6 is provided with a curved opening 29 through which a suitable tool may be inserted into the openings 28 to thereby accomplish the rotation of the adjusting ring and vary the force with which the spring 26 acts upon the clutch discs. The opening 29 aforesaid is covered by a plate 30 after the shock absorber has been properly adjusted. Said plate is held in place by means of screws 31, and the same is provided with a pin 32 adapted to extend into one of the holes 28, to thereby hold the adjusting ring in whatever position it may be placed.

As hereinbefore stated the hub 11 is preferably hollow in which case the ends thereof are closed by end plates or caps 33; and 34 designates an oil cup through which oil may be supplied to the interior of the hub, from which it passes to the bearings at the end of the hub through holes 35, as will be appreciated. This lubricating arrangement provides for lubricating the bearings of the hub; and it will be appreciated that the closed construction of the casing in which the entire operative mechanism of the device is housed provides a shock absorbing device in which the escape of oil from the casing is effectively prevented, and one in which the casing may be full or partly full of lubricating material, and the parts of the device thus submerged, whereby long life and smooth operation are secured for the device as a whole.

Having thus described and explained my invention, I claim and desire to secure by Letters Patent:

1. In a shock absorbing device of the class described a hollow casing having oppositely disposed bearings in its end walls; an oscillating hub the ends of which are supported in said bearings; a rotatable clutch ring located within said casing and supported by said hub; a plurality of clutch members operating in recesses provided in said hub and adapted to engage the inner surface of said clutch ring to thereby drive the same; a plurality of friction discs located within said casing and some of which are interlocked with said clutch ring so as to rotate therewith, while others are interlocked with said casing and remain stationary; a rotatable adjusting ring located within said casing and having a threaded periphery in engagement with a threaded portion of the interior of said casing; and a spring interposed between said adjusting ring and said discs.

2. In a shock absorbing device of the class described, a hollow casing having oppositely disposed bearings in its end walls; an oscillating hub the ends of which are supported in said bearings; a rotatable clutch ring located within said casing and supported by said hub; a plurality of clutch members operating in recesses provided in said hub and adapted to engage the inner surface of said clutch ring to thereby drive the same; a plurality of friction discs located within said casing and some of which are interlocked with said clutch ring so as to rotate therewith, while others are interlocked with said casing and remain stationary; a rotatable adjusting ring located within said casing and having a threaded periphery in engagement with a threaded portion of the interior of said casing; a spring interposed between said adjusting ring and said discs; and an opening provided in the end wall of said casing through which access may be had to said adjusting ring to thereby rotate the same.

3. In a shock absorbing device of the class described, a hollow casing having oppositely disposed bearings in its end walls; an oscillating hub the ends of which are supported in said bearings; a rotatable clutch ring located within said casing and supported by said hub; a plurality of clutch members operating in recesses provided in said hub and adapted to engage the inner surface of said clutch ring to thereby drive the same; a plurality of friction discs located within said casing and some of which are interlocked with said clutch ring so as to rotate therewith, while others are interlocked with said casing and remain stationary; an adjusting ring located within said casing and having a threaded portion in engagement with a threaded portion of the interior of said casing; a spring interposed between said adjusting ring and said discs; a series of holes provided in said adjusting ring; an opening provided in the end wall of said casing and through which access may be had to said adjusting ring; a removable plate for closing said opening; and a pin carried by said plate and adapted to enter one of the holes aforesaid in said adjusting ring.

4. In a shock absorbing device of the class described, a hollow casing having oppositely disposed bearings in its end walls; an oscillating hub the ends of which are supported in said bearings; a rotatable clutch ring located within said casing and supported by said hub; means whereby motion imparted to said hub is communicated to said clutch ring; a plurality of friction discs located within said casing and some of which are interlocked with said clutch ring so as to rotate therewith, while others are interlocked with said casing and remain stationary; a rotatable adjusting ring located within said casing and having a threaded periphery in engagement with a threaded portion provided within said casing adjacent the outer end wall thereof, so that said ring may be rotated within said casing and independently thereof; and means whereby said adjusting ring may be rotated from outside said casing and independently thereof.

In testimony whereof I affix my signature.

BENJAMIN H. ANIBAL.